UNITED STATES PATENT OFFICE.

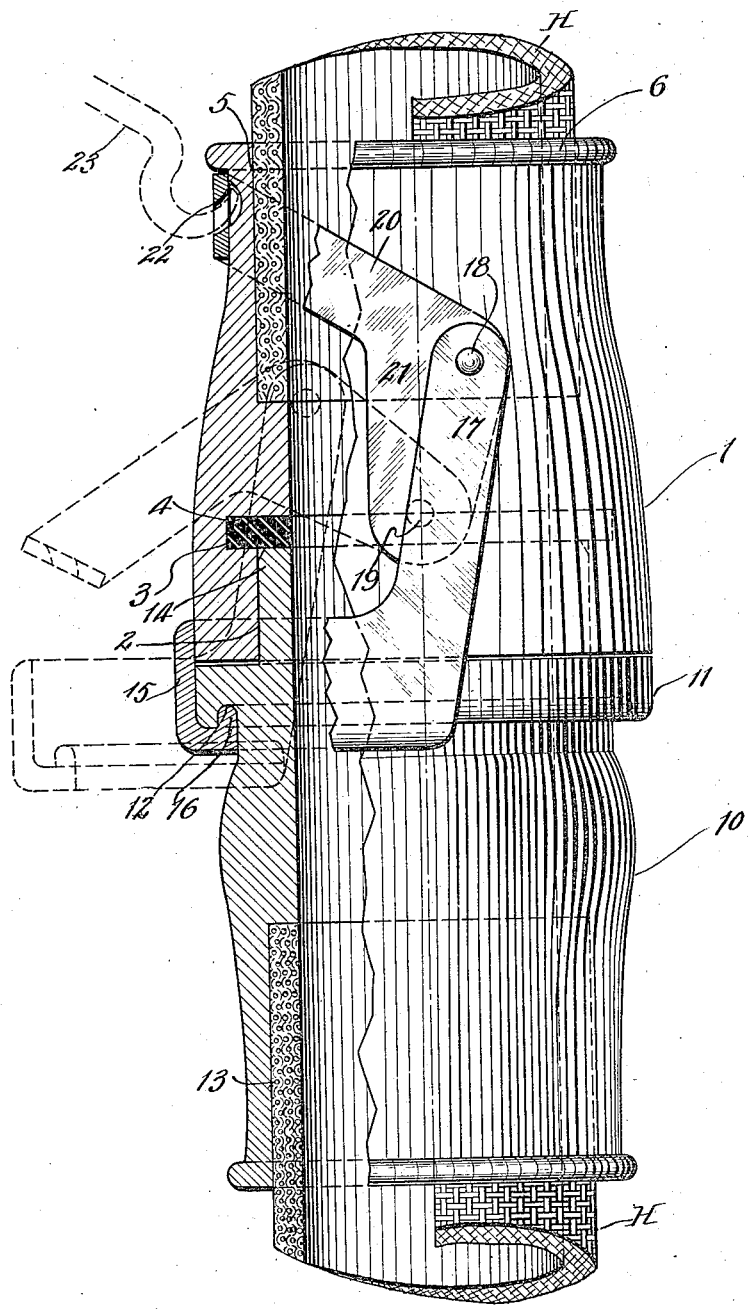

ANGUST T. SAWYER, OF LIVERMORE FALLS, MAINE, ASSIGNOR OF ONE-HALF TO WALTER H. DIXON.

HOSE-COUPLING.

1,242,047.	Specification of Letters Patent.	Patented Oct. 2, 1917.

Application filed September 18, 1915. Serial No. 51,501.

*To all whom it may concern:*

Be it known that I, ANGUST T. SAWYER, of Livermore Falls, in the county of Androscoggin and State of Maine, have invented certain new and useful Improvements in Hose-Couplings; and I do hereby declare that the following is a full and exact description thereof, reference being had to the accompanying drawings, and to the letters of reference marked thereon, making a part of this specification.

This invention relates to improvements in hose couplings and the object thereof is to provide a simply constructed coupling of this character in which eccentric levers are employed for forcing the abutting ends into intimate union and whereby they may be quickly connected and disconnected and when connected will insure a fluid tight union.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawing a side elevation of a hose coupling is shown constructed in accordance with this invention with parts broken out and in section.

In the embodiment illustrated, a female member 1 is shown having a recess 2 at one end on its inner face to receive a male member 10. An annular groove 3 communicates with the inner end of the recess 2 and is designed to receive a gasket 4 which extends across the telescoping end of the member 10 and forms a fluid tight connection between the members.

The male member 10 is provided at its coupling engaging end with an annular flange 11 having a groove 12 on its rear face to receive and interlockingly engage a lip 16 carried by a clamp 15. This clamp 15 is in the form of a semi-circular band or stirrup L-shaped in cross section and having flat metal attaching arms 17 extending obliquely from the free edge of its long arm at the ends thereof, the free ends of said arms being pivoted to the arms of an operating lever 20 arranged on diametrically opposite sides of the member 1, as shown at 18 and in such position that when the clamp is closed, it will positively draw the members 1 and 10 together and hold them in fluid tight relation. The flanged end of the male member and the adjacent abutting end of the female member are of the same diameter so that their outer faces are arranged flush with each other when the parts are assembled to provide for the joint between them being spanned by the long arm of the clamp with the inner face of said arm lapping and closely hugging said members.

The clamp operating lever 20 is shown in the form of a U- or stirrup-shaped member of flat metal, the arms 21 of which extend laterally edgewise from opposite ends thereof and at an oblique angle and are pivoted at their junction with the body portion of the lever at their outer corners to the free ends of the arms 17 of the clamp 15. The free ends of the arms 21 of said lever are fulcrumed at 19 to the member 1 at diametrically opposite points. As shown clearly in the drawing, the arms of the lever 20 and those of the clamp 15 extend in opposite directions toward each other and the oblique arrangement of these arms provides for the positioning of their pivotal connection inwardly beyond the fulcrum of the lever so that when in operative position the parts will be securely locked and when the lever is swung downwardly into the dotted line position, the clamp connected with the arms thereof will swing downwardly and outwardly and thereby cause its lip 16 to become disengaged from the grooved flange of the member 10 and thus permit the coupling members to be separated. The semi-circular lever 20 is provided with an obliquely disposed aperture 22 preferably formed midway the length thereof and which is designed to receive a hook 23 for actuating the lever to throw it into inoperative position.

The outer or hose receiving ends of these coupling members 1 and 10 are each provided with recesses 5 and 13 respectively to receive the ends of the hose H to be connected. The female member 1 is provided around its outer end with a laterally extending bead 6 against the inner edge of which the lever 20 is designed to abut when in closed position as shown in full lines in the drawings and be thereby protected by said bead and prevented from being accidentally opened.

From the above description, it will be obvious that when the coupling members 1 and 10 have been engaged with the hose ends H and the abutting ends of said couplings arranged as shown in full lines in the drawing, with the telescoping reduced portion or neck 14 of the male member inserted in the seat or socket 2 of the female member, inward swinging of the lever 20 will cause the clamp 15 to move inwardly and the lip 16 thereof to pass into and interlockingly engage the groove 12 in the flange 11 of the male member. When the lever 20 reaches the limit of its inward movement, the outer edge of the body portion thereof will be housed under the bead 6 on the member 1 as is shown in full lines in the drawing. When this lever is in this position, the pivots which connect the arms 17 of the clamp with said lever having passed their dead centers will reliably lock the parts in closed operative position and hold them in this position until the lever is swung forwardly and the locking action between it and the clamp 15 thereby broken.

I claim:

In a hose coupling, a female member having a recess in its inner face at one end, a male member having a reduced neck fitting the recess in said female member and provided with a lateral flange extending around its periphery at the base of said neck, the flanged end of said male member and the adjacent end of said female member being of uniform diameter whereby their outer faces are flush with each other when the parts are assembled, said flange having an annular groove on its rear face, a semi-circular clamp L-shaped in cross section with an inturned lip extending at right angles from the free edge of the short arm of the L, said lip being adapted to interlockingly engage the groove in the flange of the male member when the parts are assembled, the longer arm of said clamp spanning the joint between said members, a flat substantially U-shaped clamp-operating lever pivoted to the extremities of the arms of said clamp, the extremities of the lever arms being fulcrumed to said female member at points so spaced as to cause said lever to snugly engage said member when in closed position.

In testimony whereof I have signed my name to this specification in the presence of two subscribing witnesses.

ANGUST T. SAWYER.

Witnesses:
JOHN MERRIMAN,
WALTER H. DIXON.